Patented July 28, 1936

2,048,745

UNITED STATES PATENT OFFICE 2,048,745

DYE COMPOSITIONS AND METHOD OF MAKING

Jean G. Kern, Hamburg, N. Y., assignor to National Aniline and Chemical Company, Inc., New York, N. Y., a corporation of New York No Drawing. Application January 19, 1935, Serial No. 2,584

20 Claims. (Cl. 8—6)

This invention relates to stabilized nitrosamines and to their production and use. It is particularly directed to new nitrosamine dye compositions containing the stabilized nitrosamines to be hereinafter more fully described and coupling components or developers.

The stabilized nitrosamines herein described have been found to possess remarkable stability and resistance to coupling when in the presence of coupling components. Thus dye compositions of this invention do not tend to deteriorate even upon long standing and may be worked under the usual conditions of manufacture without substantial decomposition and with less possibility of explosion than are the ordinary unstabilized nitrosamine salts. The present invention, therefore, not only increases the safety of manufacture but gives a product or products of especially high quality.

The nitrosamines herein described possess excellent solubility in either water or alcohol, and in view of their high stability and quality are particularly well adapted for the preparation of printing or dyeing compositions by admixture with suitable azo developers or coupling components.

In general the stabilized nitrosamines of the present invention may be prepared by reacting primary aromatic nitrosamines of the probable general formula

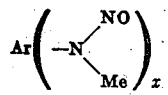

or their isomers, the diazotates, of the probable general formula

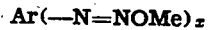

whether of the active or non-active (syn or anti) form, with a non-coupling organic sulfonate. In the above formulae Ar designates the aromatic residue of a primary aromatic amine, especially an amine of the benzene, naphthalene, anthracene (anthraquinone), or carbazole series, either substituted or unsubstituted; Me represents a metallic radical—e. g. a monovalent metal, or a radical containing a polyvalent metal linking the nitrosamine to an inorganic or organic radical (which also may be an —O—N=N—Ar radical)—or Me represents a monovalent organic amino-radical, for example an alkylolaminoradical; preferably Me represents a monovalent metal conferring solubility in water, for example, sodium or potassium; and $x$ represents a whole number usually 1, 2, or 3.

The organic sulfonates employed for the preparation of the nitrosamine compositions of this invention may be unsubstituted or may be substituted, for example, by a halogen-, nitro-, carboxy-, hydroxy-, mercapto-, or amino-group or an alkyl- or substituted alkyl-group (methyl-, chlormethyl-, hydroxy-methyl-, sulfo-alkyl-, or carboxy-alkyl, for instance), or by more than one of the same or different groups. However, where aryl or aralkyl sulfonates containing amino- or hydroxy- substituents are used, it will be understood that these substituents are in such positions that they do not render the sulfonate capable of coupling with the nitrosamine. Since the coupling and non-coupling sulfonates represent a well-known classification, the sulfonates suitable for preparation of the compounds herein described may be defined briefly as non-coupling organic sulfonates.

In the preparation of the nitrosamine compositions of the present invention, the sulfonate and nitrosamine may be employed in equimolar proportions or multiples thereof, thus one mol of a nitrosamine may be stabilized by its interaction with one mol of the sulfonate. However, the action of more than an equimolar quantity of the sulfonate also results in the production of a stabilized compound, and likewise with the addition to the nitrosamine of less than an equimolar quantity of the sulfonate there results a product or products of greater stability than the untreated nitrosamine but of less stability than the products resulting from the interaction of equimolar quantities of the nitrosamine and sulfonate. Preferably, therefore, I employ the nitrosamine and sulfonate in equimolar ratio.

The production of the stabilized nitrosamines may be effected simply by dissolving the nitrosamine and the organic sulfonate in a solvent and applying heat to the solution. Any suitable inert solvent may be employed, for example, water, or ethyl or methyl alcohol or aqueous mixtures thereof. In some cases the products may be obtained merely by long standing of a solution of the two components without the application of heat. The stabilized nitrosamines resulting from this treatment appear to be condensation products of the nitrosamine and the organic sulfonate. Whatever the nature of the condensation, the isolated products do not possess the ability to couple with the usual coupling components. It is evident, therefore, that the products are not salts of the type, Ar—N=N—O—SO$_2$—R, where Ar is the aromatic radical of a diazotized amine and R is the organic radical of the sulfonic acid, because these salts are of the active coupling type. The process of preparing the present compositions is distinguished from processes for the preparation of such salts by the fact that the latter processes involve treatment of an acid diazo solution, in which the diazo compound is present in the form, Ar—N=NCl or

while, as indicated above, the present invention involves treatment of nitrosamines or diazotates.

The products, when prepared by heating a solution of a nitrosamine or diazotate and a sulfonate, may be precipitated by cooling or may be salted out from concentrated solution and may be isolated by filtration. The products also may be recovered by evaporation of the solution at atmospheric pressure or in vacuum. The filter-press cake may be dehydrated in any suitable manner, for example (and especially when the products are separated by filtration) by the addition of a dehydrating salt, such as anhydrous sodium acetate, anhydrous sodium sulfate, or anhydrous trisodium phosphate, or the partially hydrated forms thereof.

Dye powders may be prepared from pastes or solutions containing the stabilized nitrosamines of the present invention and soluble metal salts of coupling components either with or without the presence of thickening agents, by drying the paste or solution in suitable manner, as by evaporation either under atmospheric pressure or in vacuum. Any suitable drier may be used, for example, drying pans or a rotary, single drum or double drum drier. Dehydration of the compositions, either evaporated as proposed above or not, may be effected, as in the case of the stabilized nitrosamines alone, by means of a dehydrating agent, such as an anhydrous or partially hydrous alkali-metal acetate, sulfate, or normal phosphate. By this method, stable nitrosamine printing powders are obtained. The aqueous pastes made up from such powders likewise possess marked stability compared with ordinary nitrosamine dye pastes and whereas, on account of progressive coupling, the ordinary pastes materially diminish in strength within a few days of their preparation, the present pastes remain unaffected. The dye pastes may be applied in the usual manner as by printing on a textile fabric and subjecting the printed fabric to the action of acid in liquid or vapor phase, as in a carbon dioxide or acetic acid ager.

The sulfonates which may be employed in accordance with the present invention may be grouped broadly as the non-coupling, organic sulfonates. Thus both aliphatic and carbocyclic sulfonates may be employed and of the carbocyclic sulfonates, more particularly the alicyclic and aromatic (hydrogen or metal) sulfonates. However, the hydrogen, alkali-metal, or alkaline earth metal, aromatic sulfonates are employed to the best advantage. Examples of suitable sulfonates are benzene-monosulfonic-acid, benzene-disulfonic-acid, toluene-monosulfonic-acids, toluene - disulfonic - acids, naphthalene - sulfonic-acids, naphthalene-disulfonic-acids, naphthalene - trisulfonic - acids, monochlorbenzene - sulfonic-acids, dichlorbenzene-sulfonic-acids, dichlorbenzene-disulfonic-acids, chlornaphthalene-sulfonic - acids, dichlornaphthalene - disulfonic-acids, benzyl-chloride-sulfonic-acids, hydroxymethyl - benzene-sulfonic-acids, benzyl-sulfonic-acids, substituted benzyl-sulfonic-acids such as chlorbenzyl-sulfonic-acids, brombenzyl-sulfonic-acids, and nitrobenzyl-sulfonic-acids, and the metal salts of such acids, more particularly the alkali-metal or alkaline earth metal salts, e. g. 1,4-dichlor-benzene-2-sodium-sulfonate, 1-chlor-4-nitrobenzene - 2 - sodium - sulfonate, sodium-naphthalene-beta-sulfonate, 2,6-naphthalene-disodium-disulfonate, 2,7- naphthalene - disodium-disulfonate, benzyl-chloride-p-sodium-sulfonate, benzyl-bromide-p-sodium-sulfonate, benzyl-chloride-2,5-disodium-disulfonate, calcium-dimethylphenyl-disulfobenzyl - ammonium-chloride, benzyl-sodium-sulfonate, α-benzyl-ethyl-sodium-sulfonate, n-amyl-sodium-sulfonate, tetrahydronaphthalene - sodium - sulfonate, benzyl-sodium-sulfonate, benzyl-potassium-sulfonate, 2-chlorbenzyl-sodium-sulfonate, 4-chlor-benzyl-sodium-sulfonate, 2,5 - dichlor-benzyl - sodium-sulfonate, 4-brom-benzyl-sodium-sulfonate, 2-nitro-benzyl-sodium-sulfonate, 3-nitro - benzyl- sodium-sulfonate, 4-nitro-benzyl-sodium-sulfonate, 6-chlor-3 - nitro-benzyl - sodium - sulfonate, 2,4 - dinitrobenzyl - sodium - sulfonate, 4 - chlor-3,5-dinitrobenzyl-sodium-sulfonate.

As examples of the nitrosamines that may be employed in preparing the stabilized products of the present invention, the following compounds have been found especially suitable,—sodium-2,5-dichlor-nitrosaniline, sodium-m-chlor-nitrosaniline, sodium- 2 -methoxy - 5 - chlor-nitrosaniline, sodium - 2 - methyl -3,5- dichlor-nitrosaniline, sodium-2-methoxy-4-nitro-nitrosaniline, the sodium nitrosamine from 4-chlor-4'-amino-2',5'-diethoxyazobenzene, the sodium nitrosamine from benzidine or from o-dianisidine or from tetramethoxy benzidine, and sodium-2-methyl-6-chlor-nitrosaniline.

As indicated above, the invention is especially applicable to the manufacture of stable dye compositions comprising both a stabilized nitrosamine and a suitable coupling component. The coupling components normally employed with nitrosamines are available for use with the stabilized nitrosamines of the present invention. Such coupling components (or developers) are the beta-naphtholates, e. g. the alkali-metal salts of beta-naphthol, 2 - hydroxy - naphthalene - 1 - sulfonic acid, 2,1- and 2,3-hydroxy-naphthoic acid and its arylides, especially 2,3-hydroxy-naphthanilide and 2,3-hydroxy-naphthoic - o - toluidide; and aceto-acetic acid compounds, e. g. alkali-metal salts of aceto-acetic-acid and arylides of aceto-acetic-acid.

Printing pastes prepared in accordance with the present invention may, of course, contain other constituents than the stabilized nitrosamine and developer; for example, they may contain penetrants, solvents, dispersing agents, oxidizing agents, reduction inhibitors, or assistants, among which may be mentioned the soluble salts of acid esters of inorganic polybasic acids set forth and claimed in my copending applications, Serial No. 688,194 filed September 5, 1933, and Serial Nos. 673,030 and 673,031, filed May 26, 1933, for instance isobutyl sodium sulfate or n-amyl sodium sulfate.

Examples of dispersing agents and penetrants are leukanol, alkyl sulfonates, aryl sulfonates, sulfonated oils, alkyl-aryl sulfonates, and aralkyl sulfonates.

The following examples further illustrate the nature of my invention.—

*Example 1.*—Sodium - 2,5 - dichlornitrosaniline

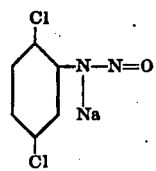

is prepared in the customary manner by treating 2,5-dichlorbenzene-diazonium-chloride with an aqueous solution of NaOH in slight excess over the stoichiometrical quantity for converting the diazonium chloride to the sodium nitrosamine, filtering off the nitrosamine formed, dehydrating the filter-press cake by the addition of about 30% of anhydrous trisodium phosphate based on the weight of the filter cake. The dry product formed in this manner contains approximately 30 to 35% of sodium-2,5-dichlornitrosaniline, 3–5% free NaOH, and trisodium phosphate hydrate formed by the dehydration process together with a small amount of sodium chloride resulting from the action between the sodium hydroxide and diazonium chloride.

640 parts of the dry nitrosamine product thus obtained, and containing the sodium nitrosamine obtainable from 162 parts of dichloraniline, are dissolved in 1500 to 2000 parts of cold water and to this solution is added 321 parts, i. e., an equimolar quantity, of 1,4-dichlorbenzene-2-sodium-sulfonate,

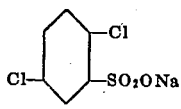

The mixture is heated and stirred to effect complete solution, the temperature being maintained at 75 to 80°C. and the stirring at this temperature being continued for 1 to 2 hours. The hot solution is then filtered and the filtrate allowed to cool causing the precipitation of fine crystals of the stable nitrosamine product. This product may be isolated in ordinary manner as by filtration, the product thus obtained being of excellent quality and purity.

The nitrosamine product formed by the above method possesses a stability greatly in excess of that of the "anti" form of the sodium diazotate of the 2,5-dichloraniline in regard to its tendency to couple or decompose. Its resistance to coupling is indicated by the fact that it may be boiled in aqueous solution with the alkali-metal salts of developers, for example sodium-beta-naphtholate, without the formation of the corresponding azo dye. Upon acidifying a mixture of the stable nitrosamine composition and a developer, such as sodium-beta-naphtholate, the azo dye is produced in practically quantitative yield.

The dry nitrosamine product obtained as above is mixed with an equimolar quantity of a suitable developer, for example, the sodium salt of 2,3-hydroxy-naphthoic-ortho-toluidide

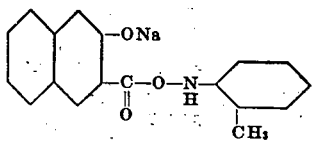

with the formation of a very stable printing or dyeing composition which in appearance is a fine yellow powder, very soluble in printing pastes. When dissolved in water containing a thickening agent, the nitrosamine product forms an excellent dyeing liquor very suitable for dyeing by the padding method.

*Example 2.*—178.51 parts of sodium-meta chlor-nitrosaniline

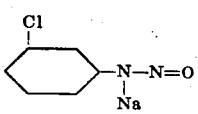

obtained for example by the treatment of meta-chlor-benzene-diazonium-chloride with NaOH, the product being filtered off and freed in so far as posible from NaOH, are dissolved in 1500 parts of methyl alcohol. 228.3 parts of benzyl-chloride-p-sodium-sulfonate

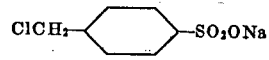

are added to this solution. The resultant mixture is boiled under reflux for 1 to 2 hours with agitation. The hot solution is then filtered and the filtrate is cooled, whereby an abundant crystalline precipitate is obtained. This precipitate is filtered off and dried at 60° C. in vacuum. The product is very soluble in water or methyl or ethyl alcohol and presents greatly improved stability against coupling and decomposition. The product is thought to be a mixture of the coordination product of benzyl-chloride-p-sodium-sulfonate and sodium-meta-chlor-nitrosaniline with a complex salt of the sodium-meta-chlor-nitrosaniline and hydroxymethyl-benzene-p-sodium-sulfonate, the latter product being formed by partial hydrolysis of the benzyl-chloride-p-sodium-sulfonate, and also contains a small amount of another complex salt which appears to be the methoxymethyl-benzene-p-sodium-sulfonate in combination or admixture with the sodium-meta-chlor-nitrosaniline.

If benzyl-bromide-p-sodium-sulfonate is substituted for the benzyl-chloride-p-sodium-sulfonate, a product of similar general character is obtained.

*Example 3.*—178.51 parts of sodium-meta-chlor-nitros-aniline obtained as in Example 2, are dissolved in 1500 parts of cold water. 330.31 parts of benzylchloride-2,5-disodium-disulfonate

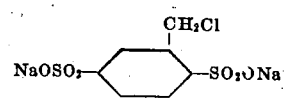

are added to the solution, and the resultant mixture is stirred at 80° to 90° C. under a reflux for about one hour. The hot solution which is thus formed is filtered and cooled, whereupon a crystalline precipitate is obtained resembling that obtained in Example 2. This precipitate may be isolated in suitable manner as in Example 2 and is composed mainly of a coordination product of sodium-meta-chlor-nitrosaniline with benzyl-chloride-2,5-disodium-disulfonate.

*Example 4.*—Equimolar quantities of sodium-meta-chlor-nitrosaniline and the calcium salt of N-dimethyl-N-phenyl-2,5-disulfo-benzyl-ammonium-chloride

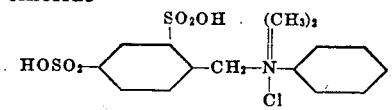

are dissolved in ethyl alcohol and heated under reflux at the boiling temperature for about one hour. The solution is then cooled with resulting formation of a precipitate of a complex compound or coordination product of sodium-meta-chlor-nitrosaniline with calcium-2,5-disulfonate of benzyl-chloride and/or of the calcium-2,5-disulfonate of benzyl-hydroxide. Dimethylaniline formed during the reaction remains in solution in the alcohol and is thus separated from the nitrosamine product. Water may be used as the solvent in lieu of ethyl alcohol but in this case, because of the relative insolubility of dimethylaniline in water, the separation of the dimethylaniline and nitrosamine product will not be readily effected. The calcium salt may be converted into the more soluble sodium salt by treating a solution of the product with sodium carbonate at room temperature, the resulting calcium carbonate being separated by filtration; the sodium salt then may be obtained by crystallization from the filtrate.

*Example 5.*—640 parts of a sodium-2,5-dichlor-nitrosaniline and trisodium phosphate hydrate mixture obtained as in Example 1 are mixed with 1500 parts of ethyl alcohol at 40° C. The insoluble inorganic salts are filtered off and into the alcoholic solution containing the 2,5-dichlor-nitrosaniline 330 parts of 1-chlor-4-nitrobenzene-2-sodium-sulfonate

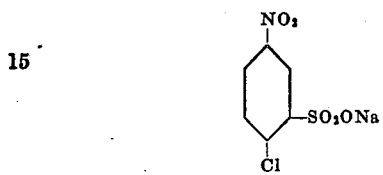

are added and the mixture is heated to 60° C. To the hot solution about 350 parts of the sodium salt of 2,3-hydroxy-naphthoic-o-toluidide is added and the mixture is stirred until solution is complete. The solution is then evaporated to dryness under vacuum. In this manner a very homogeneous, stable printing compound is obtained which may be dissolved to form a printing paste suitable for the printing of textile fabrics of any kind, including artificial fibers produced from regenerated cellulose or nitro-cellulose and/ or fibers produced from other cellulose esters or from cellulose ethers, thereby producing brilliant shades of scarlet of good penetration and exceptional fastness. n-Amyl-sodium-sulfonate

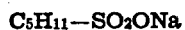

may be used in place of 1-chlor-4-nitrobenzene-2-sodium sulfonate and an analogous product obtained.

*Example 6.*—672 parts of a sodium nitrosamine paste produced from 168 parts of 5-nitro-2-amino-anisole

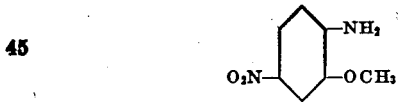

are dissolved in 2000 parts of cold water and to the solution 351 parts of 1,4-dichlorbenzene-disodium-disulfonate are added. The solution is heated to about 70° C. for one hour, is then treated with animal charcoal for the purpose of purification, and is separated from the animal charcoal. To the resultant purified solution sodium chloride is added to salt out the product. The solution is then filtered at about 60° C., and the filtrate is cooled, whereupon a crystalline precipitate is obtained that may be isolated in the manner described in Example 1.

The product may be mixed with an equimolar quantity of the sodium salt of 2,3-hydroxy-naphthoic-o-toluidide for the preparation of dyeing compositions. Such a composition, when printed or dyed on the fibers, yields, upon acidic treatment, a red of very brilliant shade. Instead of salting out the crystalline product printing compositions may be prepared by evaporation of the solution to dryness after the addition of an alkali-metal salt of a developer. In place of dichlorbenzene-disodium disulfonate there may be used 234 parts of tetrahydronaphthalene-sodium-sulfonate whereby a corresponding analogous product is obtained.

*Example 7.*—672 parts of sodium nitrosamine paste produced from and corresponding to approximately 168 parts of 4-chlor-2-amino-anisole

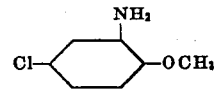

are dissolved at 70° C. with 260 parts of 1-chlor-4-nitro-benzene-2-sodium-sulfonate

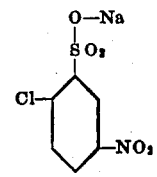

in 1500 parts of water. To the resultant solution 290 parts of the sodium salt of 2,3-hydroxy-naphthanilide

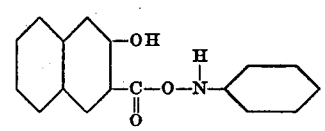

are added with agitation until it is dissolved.

The stabilized nitrosamine product may be obtained by distilling off the excess water in vacuum. The resulting paste then may be dehydrated by addition of about 375 parts of anhydrous trisodium phosphate.

If desired, the aqueous solution of the stabilized nitrosamine may have added thereto 375 parts of sodium acetate, sodium chloride, dextrin, or another soluble inert material before evaporation of the water. Upon subsequent evaporation to dryness by means, for example, of a double drum drier either under atmospheric pressure or vacuum a dry printing compound may be obtained which possesses excellent solubility in water, and printing pastes prepared from it are much more stable than ordinary nitrosamine printing pastes.

The nitrosamine dye, when applied to fibers and subjected to acid development, yields very brilliant shades of a bluish red.

*Example 8.*—141.5 parts of 6-chlor-o-toluidine

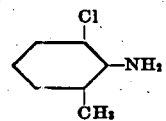

are mixed with 290 parts of aqueous 20° Bé. hydrochloric acid (31%) and 250 parts of ice and to the mixture 460 parts of an aqueous 15% sodium nitrite solution are added to diazotize the chlortoluidine. The diazo solution thus formed is then added at a temperature below 0° C. (about —5° C. average) to a solution of 187 parts NaOH in 1050 parts ice and water; thus forming the sodium salt of the diazo compound. The sodium diazotate solution is then added carefully to a solution of 300 parts of 50% aqueous NaOH maintained at a temperature of 118-130° C. Simultaneously with the addition of the diazotate solution 300 parts of NaOH flakes are added to the caustic soda solution; whereupon the sodium nitrosamine salt begins to precipitate. The resultant paste is diluted with water and ice sufficient to increase its mass to 3000 parts and the reaction liquor temperature is thus caused to drop to about 40° C. The nitrosamine is then filtered off from the remaining aqueous solution and freed as much as possible from the residual liquor by pressing so as to yield a press cake containing approximately 30% base.

475 parts of the nitrosamine press cake thus obtained is slurried with 3500 to 4000 parts of water and slowly heated to 50° C. To the hot slurry 249 parts of the magnesium salt of p-nitrochlorbenzene-o-sulfonic acid,

$(C_6H_3Cl.NO_2.SO_3)2Mg$, are added and the resultant mixture is maintained at 50° C. for about two hours. Norite and kieselguhr or diatomaceous earth then may be added to decolorize the reaction liquor after which it is filtered, and to the filtrate 1000–1300 parts of sodium chloride are added. The resultant solution is permitted to cool to 5° C. over a period of about 12 to 15 hours and is filtered at this temperature. The resultant press cake is then intimately mixed with 285 parts of the sodium salt of 2,3-hydroxy-naphthanilide and 80 parts isobutyl sulfate and dried in evaporating pans under a vacuum at 60° C. The resultant powder is readily dispersable and soluble for the preparation of printing compositions which, when developed on textile fibers in the usual manner, produce a bluish scarlet of excellent brilliance.

*Example 9.*—80 parts of the powder obtained as in Example 8 are dissolved in 220 parts of water and thickened with 700 parts of a neutral starch-tragacanth paste containing 300 parts of gum tragacanth 6% solution, 50 parts starch, 300 parts water, and 50 parts of a 15% normal sodium chromate solution. Cotton goods or any fabric composed of or containing for example cellulose esters or cellulose ethers, etc. are printed with the above printing paste, dried, and developed by passage through an acetic acid vapor ager or by treatment with steam and carbon dioxide gas as described in application, Serial No. 702,797 of Don W. Bissell, filed December 16, 1933, or the goods may be treated according to any standard method of development known to the art for the production of fast shades with nitrosamines. The resultant dyes are of very brilliant shade and possess not only superior brilliancy but better fastness properties than the dyes from ordinary nitrosamines using the same developers.

The term nitrosamine as used in the following claims is intended to include the isomeric diazotates.

I claim:

1. A stabilized nitrosamine dye composition comprising a coupling component and the reaction product of a non-coupling organic sulfonate with a primary aromatic nitrosamine.

2. A stabilized nitrosamine dye composition comprising a coupling component and the condensation product of a non-coupling alkali-metal organic sulfonate with an alkali-metal aromatic nitrosamine.

3. A stabilized nitrosamine dye composition comprising a coupling component and a product obtainable by interaction of an alkali-metal aromatic nitrosamine with a non-coupling sulfonate of the group consisting of hydrogen and metal aryl sulfonates.

4. A stabilized nitrosamine dye composition comprising a coupling component and a product obtainable by interaction of an alkali-metal aromatic nitrosamine with a non-coupling sulfonate of the group consisting of hydrogen and metal aralkyl sulfonates.

5. A stabilized nitrosamine dye composition comprising a coupling component and a product obtainable by heating a solution of a primary aromatic nitrosamine free from water-solubilizing carboxyl or sulfonate groups and a non-coupling sulfonate of the group consisting of hydrogen and metal aryl sulfonates and thereafter separating the reaction product from solution.

6. A nitrosamine dye composition comprising a coupling component and a product obtainable by heating a solution of a primary aromatic nitrosamine free from water-solubilizing carboxyl or sulfonate groups and a non-coupling sulfonate of the group consisting of hydrogen and metal aralkyl sulfonates and thereafter separating the reaction product from solution.

7. A stabilized nitrosamine dye composition comprising a coupling component and a product obtainable by heating a solution of a sodium nitrosaniline free from water solubilizing carboxyl or sulfonate groups and a non-coupling sodium aryl sulfonate, and thereafter separating the reaction product from solution, said product comprising the nitrosamine and sulfonate in about equimolar ratio.

8. A printing paste comprising a coupling component, a thickening agent, and the reaction product of an alkali-metal aromatic nitrosamine with a non-coupling alkali-metal aryl sulfonate.

9. A printing paste comprising an alkali-metal-beta-naphtholate, a thickening agent, and the reaction product of equimolar quantities of a sodium nitrosaniline and a non-coupling sodium aryl sulfonate.

10. A dye composition comprising an alkali-metal-beta-naphtholate and the stabilized nitrosaniline product obtainable by heating a solution of a sodium nitrosaniline free from water-solubilizing carboxyl or sulfonate groups and a non-coupling sodium aryl sulfonate, and thereafter separating the reaction product from solution, said product comprising the nitrosamine and sulfonate in about equimolar ratio.

11. A printing paste comprising a sodium beta-naphtholate and the stabilized nitrosaniline product obtainable by heating a solution of a sodium nitrosaniline free from water-solubilizing carboxyl or sulfonate groups and a non-coupling sodium aryl sulfonate, and thereafter separating the reaction product from solution, said product comprising the nitrosaniline and sulfonate in about equimolar ratio.

12. The method of preparing a stabilized nitrosamine dye composition, which comprises heating a solution of a water-soluble salt of an aromatic nitrosamine with a non-coupling aromatic sulfonate and mixing the nitrosamine product with a coupling component.

13. The method of preparing a stabilized nitrosamine dye composition, which comprises heating a primary aromatic nitrosamine free from water-solubilizing carboxyl or sulfonate groups with a non-coupling sulfonate of the group consisting of hydrogen and metal aryl sulfonates, and mixing the product with a coupling component.

14. The method of preparing a stabilized nitrosamine dye composition, which comprises heating a primary aromatic nitrosamine free from water-solubilizing carboxyl or sulfonate groups with a non-coupling sulfonate of the group consisting of hydrogen and metal aralkyl sulfonates, and mixing the product with a coupling component.

15. The method of preparing a stabilized nitrosamine dye composition, which comprises heating a solution comprising an alkali-metal aromatic nitrosamine free from water-solubilizing carboxyl or sulfonate groups and a metal aryl sulfonate and a solvent therefor, separating the reaction product from the solvent, and mixing the separated product with a coupling component.

16. The method of preparing a stabilized nitrosamine dye composition, which comprises heating a solution comprising a solvent and about equimolar quantities of a sodium nitrosaniline free from water-solubilizing carboxyl or sulfonate groups and a non-coupling sodium aryl sulfonate, thereafter separating the reaction product from solution, and mixing the separated product with a sodium-beta-naphtholate.

17. In the printing of textile fabrics, the improvement which comprises applying thereto a dye composition comprising a coupling component and the reaction product of a non-coupling organic sulfonate with a primary aromatic nitrosamine.

18. In the printing of textile fabrics, the improvement which comprises applying thereto a dye composition comprising a coupling component and a product obtainable by heating a solution of a primary aromatic nitrosamine with a non-coupling organic sulfonate.

19. In the printing of textile fabrics, the improvement which comprises printing thereon a printing paste containing a coupling component and a product obtainable by heating a solution of an alkali-metal aromatic nitrosamine with a non-coupling sulfonate of the group consisting of hydrogen and alkali-metal aryl sulfonates, and thereafter developing the print on the fabric.

20. In the printing of a textile fabric, the improvement which comprises printing thereon a printing paste comprising a sodium beta-naphtholate and the stabilized nitrosaniline product obtained by heating a solution of a sodium nitrosaniline free from water-solubilizing carboxyl or sulfonate groups and a non-coupling sodium aryl sulfonate, said product comprising the nitrosaniline and sulfonate in about equimolar ratio, and thereafter subjecting the print on the fabric to acid development.

JEAN G. KERN.